Patented May 15, 1934

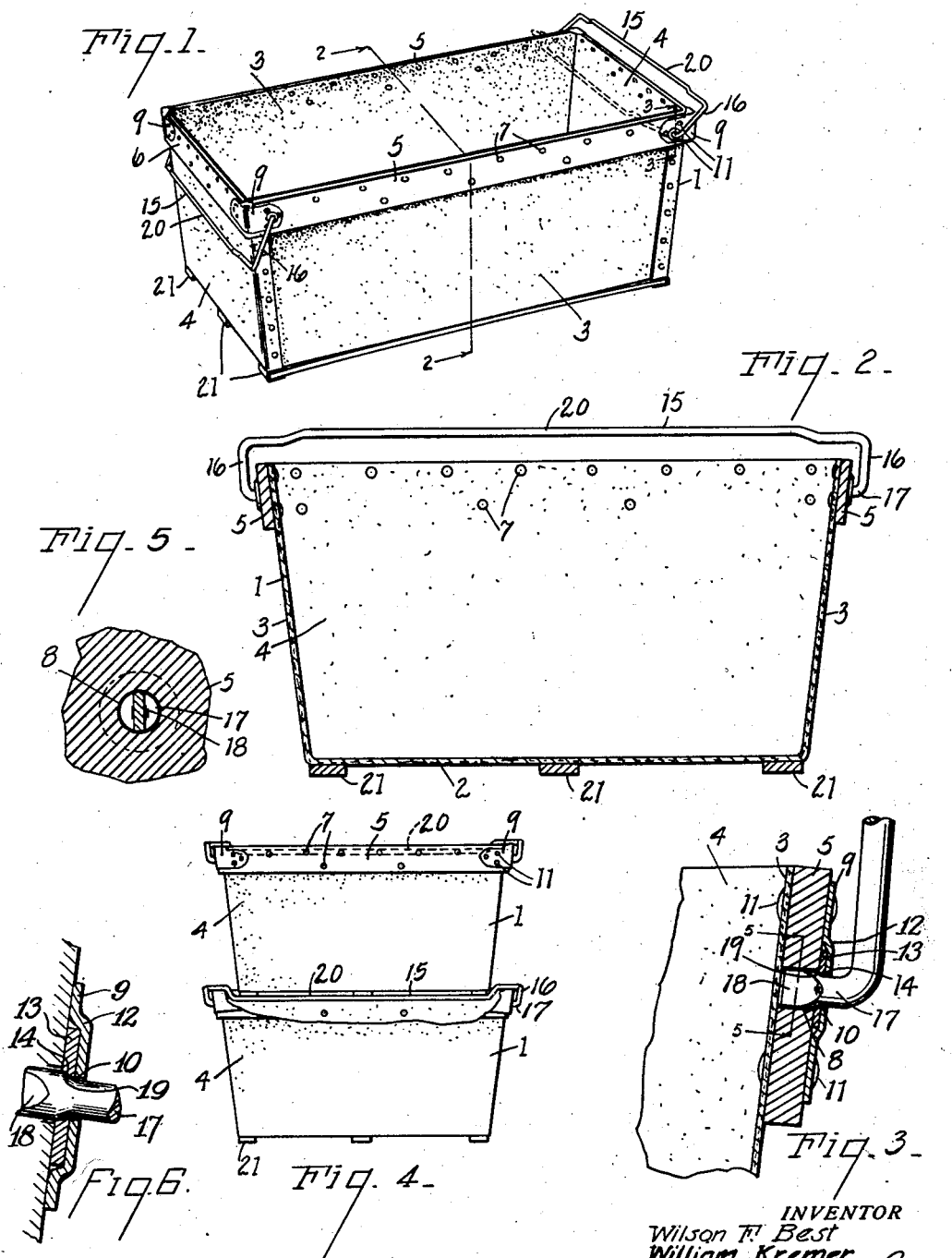

1,958,737

UNITED STATES PATENT OFFICE 1,958,737

BASKET

Wilson F. Best and William Kremer, Grand Rapids, Mich., assignors to Grand Rapids, Sample Case Company, Grand Rapids, Mich.

Application December 8, 1933, Serial No. 701,496

8 Claims. (Cl. 223—52)

The main objects of this invention are:

First, to provide an improved basket which is especially well adapted for use in the delivery of articles such as bread, groceries, provisions and the like.

Second, to provide in a basket of this character improved means for connecting the handles to the basket.

Third, to provide a basket having the above desirable features and characteristics and which is very simple and economical in its parts, very light, yet strong and rugged in construction and highly suitable for the purpose intended.

Objects relating to details and economies of our invention will appear from the description to follow. The invention is defined and pointed out in the claims.

A structure which is a preferred embodiment of our invention is illustrated in the accompanying drawing, in which:

Fig. 1 is a perspective view of a basket embodying the features of our invention.

Fig. 2 is an enlarged section on a line corresponding to line 2—2 of Fig. 1.

Fig. 3 is an enlarged fragmentary detail section on a line corresponding to line 3—3 of Fig. 1.

Fig. 4 is a view in end elevation of two of the baskets arranged in stacked formation, a portion of the lower basket being broken away to show how the upper basket rests on the handles which constitute stacking bars.

Fig. 5 is a fragmentary detail section on line 5—5 of Fig. 3.

Fig. 6 is an enlarged fragmentary detail section similar to Fig. 3.

In the embodiment of our invention illustrated in the drawing, numeral 1 indicates a basket comprising a bottom 2 and upwardly and outwardly inclined side and end walls 3, 3 and 4, 4, respectively. The basket is preferably formed of fiber or fiberboard which is light in weight and quite suitable for our purpose. Side and end rim members 5, 5 and 6, 6, respectively, are secured to the side and end walls of the basket on the outer sides and at the top edges thereof as by rivets 7. The rim members are preferably of wood and are held in intimate association with the walls of the basket by the rivets and forming therewith a substantially integral structure. These rim pieces may be and preferably are of quite thin stock. The side rim members have opposed bores 8 near their ends.

Angled corner irons 9 are secured to the rim members and have openings 10 registering with the bores 8 in the side rim members. The corner irons are preferably stampings of sheet metal and are connected to the rim members preferably by rivets 11, the rivets extending through the bracket, rim member, and wall of the basket. The openings 10 in the corner brackets are surrounded by annular offsets 12 in which are seated disk-like bearing members 13 having inwardly facing tapered bearings 14.

The basket is provided with bail-like handles 15, 15 having lateral arms 16, 16 terminating in inturned pintles 17, 17 extending through the openings 10 and having flattened end portions 18 within the bores 8. The flattened end portions provide outwardly facing inclined parts 19 coacting with the bearings 14. The handles are preferably formed of round rod stock.

With the parts thus arranged, the handles are free to swing over the end walls of the basket to rest on the side walls to support a similar basket, as shown by Fig. 4, the handles having a downwardly offset basket receiving portion 20 when in such position. The bottom of the basket is reinforced by spaced slats 21, preferably of wood, which are arranged longitudinally of the basket so as to rest on the downwardly offset basket receiving portions of the handles when the baskets are stacked.

It will be noted that the rivets for securing the fiberboard walls to the rim pieces are disposed adjacent the top and bottom of the rim pieces, the purpose of this being to provide a secure attachment which results in the side walls reinforcing the relatively thin rim pieces of wood and the rim pieces reinforcing and stiffening the walls. The corner irons are secured by rivets arranged through the walls of the rim pieces and the corner irons likewise resulting in the very great strength and durability from relatively light material.

It will be appreciated that these handles and delivery baskets are handled a great deal so that lightness and strength and durability are features greatly to be desired. The handles are secured effectively so that they cannot become detached and also so that heavy loads can be carried without danger of breakage; the parts are so reinforced that the strains are effectively distributed. By providing the disk-like bearing members to receive the strains, comparatively light sheet metal stampings may be employed but they are effectively reinforced and supported to withstand the strains to which they are subjected.

We have illustrated and described our improvements in an embodiment which we have found very practical. We have not attempted to illustrate or describe other embodiments or adaptations, as it is believed this disclosure will enable those skilled in the art to embody or adapt our improvements as may be desired.

Having thus described our invention, what we claim as new and desire to secure by Letters Patent, is:

1. A basket comprising a bottom and upwardly diverging side and end walls of fiberboard, side and end rim pieces of wood disposed on the outer sides of the side and end walls and riveted thereto, the upper edges of the rim pieces being substantially flush with the upper edges of the walls, angled sheet metal corner irons disposed in overlapping relation to the side and end pieces and secured thereto by rivets disposed through the walls, rim pieces and corner irons, said corner irons having circular offsets with central holes therein, the side rim pieces having bores aligned with said holes, disk-like bearing members seated in said offsets with their inner sides in supporting engagement with the sides of the rim side pieces, and bail-like handles formed of round stock, the arms of the handles terminating in inturned pintles disposed through said openings in said corner irons in bearing engagement with said bearings with the ends of the pintles projecting into said bores and flattened to provide enlargements preventing the withdrawal of the pintles, the arms of the handles being of such length that the handles may be swung over the end walls to permit nesting of one basket within another or to rest upon the side walls providing stacking rods, the cross members of the handles being offset to receive a superimposed basket when the handles are adjusted to stacking position.

2. A basket comprising a bottom and upwardly diverging side and end walls of fiberboard, side and end rim pieces of wood disposed on the outer sides of the side and end walls and riveted thereto, angled corner irons disposed in overlapping relation to the side and end pieces and secured thereto by rivets disposed through the walls, rim pieces and corner irons, said corner irons having offsets with central holes therein, the side rim pieces having bores aligned with said holes, disk-like bearing members seated in said offsets with their inner sides in supporting engagement with the sides of the rim side pieces, and bail-like handles, the arms of the handles terminating in inturned pintles disposed through said openings in said corner irons in bearing engagement with said bearings with the ends of the pintles projecting into said bores and enlarged to prevent the withdrawal of the pintles, the arms of the handles being of such length that the handles may be swung over the end walls to permit nesting of one basket within another or to rest upon the side walls providing stacking rods.

3. A basket comprising a bottom and upwardly diverging side and end walls of fiberboard, side and end rim pieces of wood disposed on the outer sides of the side and end walls and riveted thereto, corner irons disposed in overlapping relation to the side and end pieces and secured thereto by rivets disposed through the walls, rim pieces and corner irons, said corner irons having offsets with central holes therein, the side rim pieces having bores aligned with said holes, disk-like bearing members seated in said offsets with their inner sides in supporting engagement with the sides of the rim side pieces, and bail-like handles, the arms of the handles terminating in inturned pintles disposed through said openings in said corner irons to coact with said bearings with the ends of the pintles projecting into said bores and upset to provide enlargements preventing the withdrawal of the pintles.

4. A basket comprising a bottom and upwardly and outwardly inclined side and end walls of fiberboard, side and end rim members of wood riveted to said side and end walls on the outer sides and near the top edges thereof, the side rim members having opposed bores near their ends, angled corner brackets of sheet metal riveted to said rim members and having openings registering with said bores and surrounded by annular offsets, disk-like bearing members seated in said offsets and having inwardly facing inclined bearings, bail-like handles of round stock having lateral arms terminating in inturned ends extending through said corner bracket openings and having flattened end portions within said bores and outwardly facing inclined journal portions coacting with said bearings, said handles being free to swing over the end walls and rest on said side walls to support a similar basket, the handles having a downwardly offset basket receiving portion when in such position, and spaced longitudinal bottom reinforcing slats adapted to rest at their ends on said handles.

5. A basket comprising a bottom and upwardly and outwardly inclined side and end walls of fiberboard, side and end rim reinforcing members of wood secured to said side and end walls on the outer sides and near the top edges thereof, the side rim members having opposed bores near their ends, angled corner brackets of sheet metal secured to said rim members and having openings registering with said bores and surrounded by annular offsets, disk-like bearing members seated in said annular offsets, and bail-like basket end handles having lateral arms terminating in inturned ends extending through said corner bracket openings and having enlarged end portions within said bores coacting with said bearing members, said handles being free to swing over the end walls and rest on said side walls to support a similar basket, the handles having a downwardly offset basket receiving portion when in such position.

6. A basket comprising a bottom and side and end walls, side and end rim reinforcing members secured to said side and end walls, the side rim members having opposed bores near their ends, angled corner brackets secured to said rim members and having openings registering with said bores and surrounded by annular offsets, bearing members seated in said annular offsets, and bail-like basket end handles having lateral arms terminating in inturned ends extending through said corner bracket openings and having enlarged end portions within said bores coacting with said bearing members.

7. A basket comprising walls of fiberboard, a rim reinforcing member of wood riveted to said side walls on the outer side and near the top edge thereof, the rim member having opposed bores, brackets of sheet metal riveted to said rim member and having openings registering with said bores and surrounded by offsets, disk-like bearing members seated in said annular offsets and having inwardly facing inclined bearings, and a bail-like basket handle having lateral arms terminating in inturned ends extending through said corner bracket openings and having flattened end portions within said bores and outwardly facing inclined journals coacting with said bearing members.

8. A basket comprising walls, a rim reinforcing member secured to said walls, the rim member having opposed bores, brackets secured to said rim member and having openings registering with said bores and surrounded by offsets, bearing members seated in said offsets, and a bail-like basket handle having lateral arms terminating in inturned ends extending through said bracket openings and having enlarged end portions within said bores coacting with said bearing members.

WILSON F. BEST.
WILLIAM KREMER.